Figure 1:
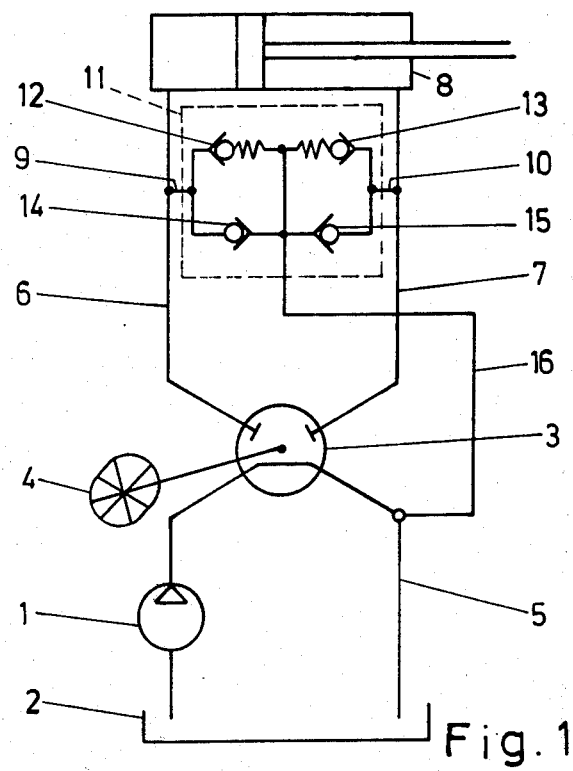

United States Patent [19]
Rasmussen

[11] 3,926,210
[45] Dec. 16, 1975

[54] VALVE COMBINATION FOR HYDRAULIC SYSTEMS

[75] Inventor: Ivar Rasmussen, Sonderborg, Denmark

[73] Assignee: Danfoss A/S, Nordborg, Denmark

[22] Filed: Apr. 12, 1974

[21] Appl. No.: 460,278

[30] Foreign Application Priority Data
Apr. 14, 1973 Germany............................ 2318962

[52] U.S. Cl. ................. 137/491; 91/451; 137/596.2
[51] Int. Cl.² .......................................... F15B 21/00
[58] Field of Search ... 91/451, 452; 137/489, 489.3, 137/490, 491, 596.2

[56] References Cited
UNITED STATES PATENTS
| | | | |
|---|---|---|---|
| 3,362,430 | 1/1968 | Olen ................................ | 91/451 X |
| 3,506,031 | 4/1970 | Stacey............................. | 137/491 X |

FOREIGN PATENTS OR APPLICATIONS
| | | | |
|---|---|---|---|
| 1,251,906 | 12/1960 | France ............................... | 137/490 |

Primary Examiner—Robert G. Nilson

[57] ABSTRACT

The invention relates to a valve assembly for hydraulic systems which has the excess pressure relief function of opening when the upstream pressure exceeds the downstream pressure by a predetermined amount and the refilling function of opening when the downstream pressure exceeds the upstream pressure by a predetermined amount. Both functions involve forms of spring load valves and although one such valve is entirely contained within the other, the flow cross sections are substantially the same or at least have the same order of magnitude. The valve assembly includes an axially movable valve body which forms four pressure chambers with the casing and has four pressure faces to effect axial biasing of the valve body when subjected to fluid pressure in the pressure chambers. Restrictors are used to obtain desired pressures in two of the pressure chambers.

2 Claims, 3 Drawing Figures

VALVE COMBINATION FOR HYDRAULIC SYSTEMS

The invention relates to a valve combination for hydraulic systems which is fitted between two spaces at different pressures and which opens when the pressure in the first space exceeds the pressure in the second space by a predetermined amount (excess-pressure relief) or falls below the pressure in the second space by a smaller amount (refilling), the valve combination having a spring-loaded valve body which axial displacement establishes a connection between the two spaces.

Valve combinations of this kind are fitted for example between each of the two connecting pipes of a hydraulic motor and a return pipe leading to the tank. The excess-pressure valve which opens towards the return pipe responds when the pressure in the connecting pipe exceeds a predetermined safe value. The refilling valve, which is connected in anti-parallel and opens towards the motor, responds when the pressure in the connecting pipe falls below the pressure in the return pipe by a relatively small amount.

It is known to combine the excess-pressure valve and the refilling valve by forming the body of one valve as the seat of the other valve. In this arrangement the body of the excess-pressure valve may form the seat for the refilling valve. Alternatively the body of the refilling valve acts as the seat for the excess-pressure valve in the known device. In both cases the flow cross-section of one of the valves is smaller than that of the other valve.

The object of the present invention is to provide a valve combination of the initially described kind in which the flow cross-section of both valves is practically the same despite their being combined.

According to the invention, this object is achieved in that the valve body has four pressure faces to each of which is applied the pressure in an adjoining pressure chamber, the second pressure face facing in the same direction as the first pressure face, and the third and fourth pressure faces facing in the opposite direction, and the first pressure chamber being connected to the first space, the second pressure chamber to the second space, the third pressure chamber to the first space by way of a restrictor, and to the second space by way of a spring-loaded auxiliary valve, and the fourth pressure chamber being connected to the first space by way of a restrictor and to the second space by way of a non-return valve.

In this construction, the valve body moves in the same direction both at excess pressure and at reduced pressure. The same valve cross-section is therefore available for the relief of excess pressure and for refilling. Furthermore, because of the use of the auxiliary valve, the excess pressure can be relaxed in a better manner than previously.

In a preferred form of construction, the auxiliary valve and/or the non-return valve are disposed in the valve body. Since both valves need be of only small size, there is sufficient space for them in the valve body.

Also, it is advantageous if the first and second pressure chambers are formed directly by the first and second spaces, and the first and second pressure faces are separated by the application of the valve body to its seat. This results in a compact and simple construction.

Advantages are also achieved if the restrictors are formed by the gap between the valve body and the bore in which it is accommodated. In this construction the leakage oil which is in any case present is utilized for controlling the valve.

Figure 3:
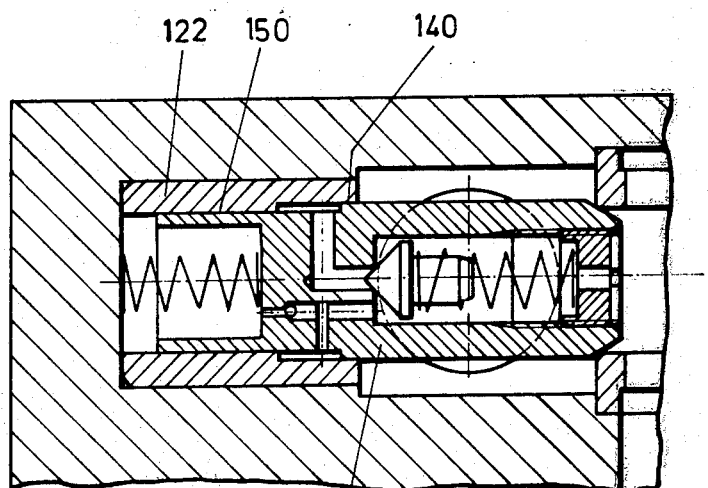
Figure 2:
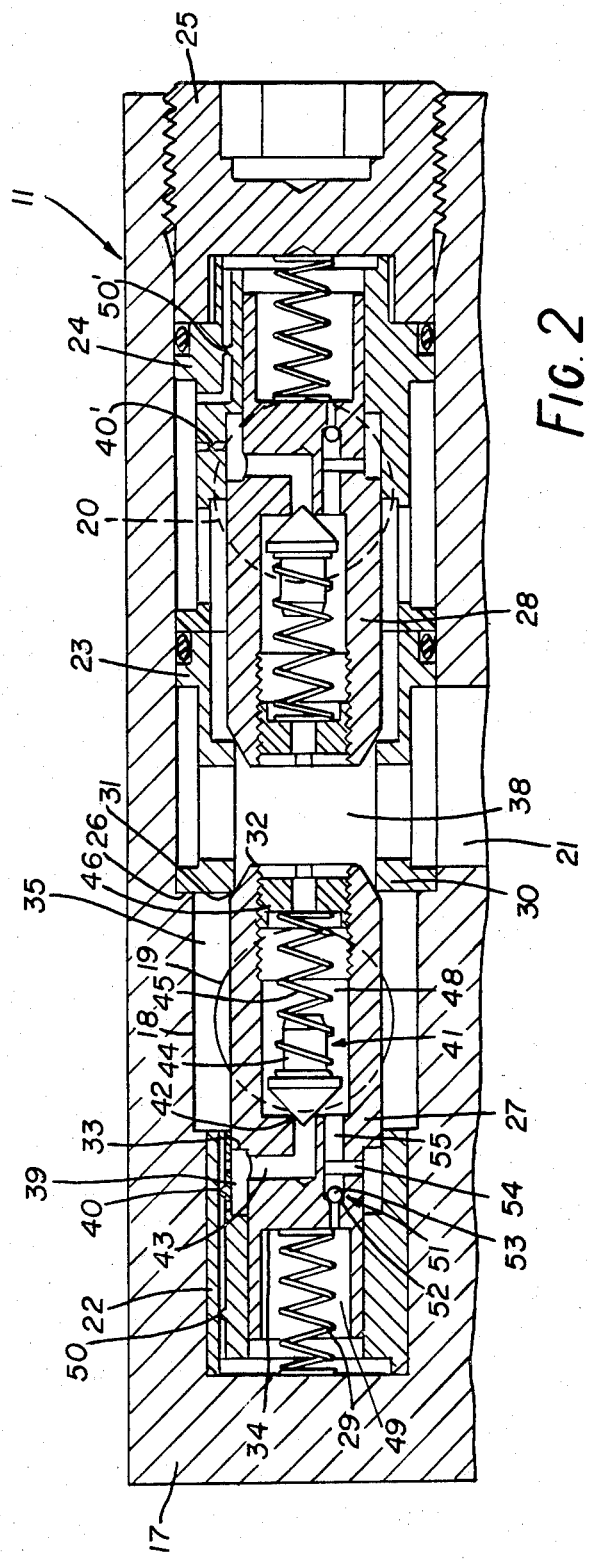

The invention will now be described in more detail by reference to two forms of construction illustrated in the drawing, in which:

FIG. 1 is a circuit diagram of a hydraulic installation in which the valve combination of the invention is used, FIG. 2 is a longitudinal section through a first form of construction of the valve combination of the invention, and FIG. 3 is a longitudinal section through part of a second form of construction of a valve combination in accordance with the invention.

In the hydraulic installation shown in FIG. 1, a pump 1 delivers compressed oil from a tank 2 to a control device 3 which is displaceable with the aid of a manually operated steering wheel 4. A return pipe 5 leads from the control device 4 to the tank 2. Two connecting pipes 6 and 7 connect the control device 3 to a hydraulic motor 8. At given times each of these pipes can function as a supply pipe and a discharge pipe. A valve combination 11 in accordance with the invention is provided between the pipes 6 and 7 and is connected thereto by pipes 9 and 10. The valve combination performs the function of two excess-pressure valves 12 and 13 and of two refilling valves 14 and 15. The excess-pressure valve 12 and the refilling valve 14 are connected in an anti-parallel arrangement between the pipe 9 and a return pipe 16. The excess-pressure valve 13 and the refilling valve 15 are connected in an anti-parallel arrangement between the pipe 10 and the return pipe 16. When excess pressure occurs in the connecting pipe 6, pressurized medium flows through the valve 12 to the tank. When reduced pressure occurs in the connecting pipe 6, the pressurized medium can pass through the valve 14 from the return pipe 16. It is of course also possible to balance the pressure at each side of the motor 8, for example by way of the excess-pressure valve 12 and the refilling valve 15.

In the form of construction seen in FIG. 2, a bore 18 is formed in a valve casing 17, which bore has a port 19 for the pipe 9, a port 20 for the pipe 10 and a port 21 for the return pipe 16. Three inserts 22, 23 and 24 are fitted in the bore 18. The insert 22 is a press fit in the bore. The inserts 23 and 24 are pressed against a shoulder 26 by a screw 25. Also, two valve bodies 27 and 28 are provided. Since the important parts of the arrangement are of practically the same construction on the two sides of the port 21, only the arrangement on the left-hand side will be described.

The valve body 27 is pressed by a relatively weak spring 29 against a valve seat 30 formed on the insert 23. The valve seat divides the end-face of the valve body 27 into a first, outer, pressure face 31 and a second, inner, pressure face 32 which face in the same direction. Also, there are provided a third pressure face 33 and a fourth pressure face 34 which face in the other direction. When the valve is opened a first space or pressure chamber 35 communicates with a second space or pressure chamber 36.

The first pressure face 31 is part of the first pressure chamber 35 and is formed by an annular space into which the port 19 leads. The second pressure face 32 is part of the second pressure chamber 37, and is formed by the interior of the insert 23 which communicates with the port 21.

The third pressure face 33 is part of a third pressure chamber 39 which is connected to the first space 35 by way of a restrictor 40 and to the second space 36 by way of a spring-loaded auxiliary valve 41. The auxiliary valve has a seat 42 in the interior of the valve body 27, having a connecting duct 43, and also has a closing member 44 and a spring 45, the bias of which can be adjusted by means of a bored screw 46. The closing member 44 and the spring 45 are disposed in a cavity 48 in the valve body 27.

The fourth pressure face 34 is part of a fourth pressure chamber 49 which is connected to the first space 35 by way of a restrictor 50 and to the cavity 48 by way of a non-return valve 51 and therefore communicates with the second space 36. The non-return valve 51 likewise opens towards the second space. It has a seat 52, a ball 53 and a pin 54 which prevents the ball from falling out of the bore 55. The restrictor 50 is disposed in series with the restrictor 40. However, as shown on the right in FIG. 2, the generally corresponding restrictors 40' and 50' are arranged in parallel instead of in series.

Referring further to the function and operation of the one way valve 51, when the pressure in the space 35 increases the oil flows through the restrictors 40 and 50 to the space 49 through a valve 51 to the space 48. In this way a small shock on the steering wheel will be equalized. If the pressure in the space 35 should increase to a considerably greater amount, the main valve 41 will open. This means that the valve 51 may be considered a pilot valve and the valve 41 as the main valve in this respect. This is also a reason why the chamber 49 cannot simply be vented to the atmosphere.

Another function of valve 51 is that the pressure in the line 9 (space 37) acts on the area 33 so that the valve body 27 will be closed tightly and, in case of cavitation, i.e. suction in space 35, the valve 51 will close so that the higher pressure in space 36 effects opening of the valve body 27. Valve 51 thus has the added function to insure that in the case of a flow reversal a pressure develops which is sufficient to open the valve body 27. When there are only small shocks on the steering wheel there is no need for the valve to be opened completely and thus it is only when the pressure in the space 35 is sufficiently built up that the valve 41 can open.

The above-described arrangement results in the following mode of operation:

1. When the system is operating in the normal manner, the same pressure as that in the second pressure chamber 36 obtains in the fourth pressure chamber 49 since a small stream of leakage oil flows through the restrictors 40 and 50 from the first space 35 through the fourth pressure chamber 49 and the non-return valve 51. Since the auxiliary valve 41 is closed, the same pressure obtains in the third pressure chamber 39 as in the first pressure chamber 35. Therefore, the pressure applied to the third pressure face 33, in conjunction with the pressure of the spring 29, predominates; the valve is therefore kept closed.
2. When the pressure in the space 35 exceeds a predetermined safe limit value, this pressure is transmitted to the third pressure chamber 39. When the force of the spring 45 has been overcome, the auxiliary valve 41 opens. There then occurs at the restrictor 40 a pressure-drop which leads to a reduction of the pressure in the third pressure chamber 39. Then, the force applied to the first pressure face 31 by the pressure in the first pressure chamber 35 outweighs all the forces acting in the opposite direction, and the valve body 27 is displaced to the left. The pressurized medium can now flow directly from the first space 35 into the second space 36, and the excess pressure is relaxed. When this occurs, the valve body 27 automatically assumes a position in which a force equilibrium obtains. If the pressure in the third pressure chamber 39 is kept approximately constant, the pressure in the first space 35 is also approximately constant. This condition is however fulfilled in practice since, with a suitably rated spring 45, the auxiliary valve 41 in conjunction with the above-mentioned position of equilibrium of the valve body 27 provides for an approximately constant pressure in the third pressure chamber 39.
3. When there is reduced pressure in the first space 35, the non-return valve 51 closes. The pressure effective in the first space 35 therefore obtains in the fourth pressure chamber 49. In this case the pressure acting on the second pressure face 32 preponderates in the second pressure chamber 36. The valve opens. The same cross-section is available for drawing in pressurized medium as is available as for relieving the excess pressure.

The form of construction seen in FIG. 3 is in principle the same as that shown in FIG. 2. The only difference is that in the FIG. 3 arrangement another insert 122 is used which has no restrictors 40 and 50. Instead these restrictors are formed by the usual gaps 140 and 150 between the valve body 127 and the bore of the insert 122.

The non-return valve 51 may also be disposed at some other point, for example in a duct which connects the pressure chamber 49 directly to the pressure chamber 35 and which extends through the insert 22 or 24 and through the casing 17.

I claim:

1. A valve assembly for hydraulic installations which is connectable between two different pressures in first and second regions and which opens when the pressure in a first chamber connected to said first region exceeds the pressure in a second chamber connected to said second region by a predetermined amount or falls below the pressure in said second region by a smaller amount, comprising, a casing, a valve member axially movable in said casing, a valve seat, said valve member having a face engageable with said seat, resilient means biasing said valve member towards said seat, said first and second pressure regions and chambers being upstream and downstream respectively relative to said valve seat, said valve member having pressure faces in both of said chambers for biasing said valve member in an opening direction, said valve member and casing forming third and fourth chambers, said valve member having third and fourth pressure faces in said third and fourth chambers for biasing said valve member in a closing direction, fluid communication between said first and third chambers with restrictor means disposed therebetween, fluid communication between said first and fourth chambers with restrictor means disposed therebetween, spring loaded valve means between said third and second chambers, and one way valve means between said fourth and second chambers.

2. A valve assembly according to claim 1, characterized in that said spring loaded valve means and said one way valve means are disposed internally of said valve member.

* * * * *